(12) United States Patent
Sunaga

(10) Patent No.: US 7,262,736 B2
(45) Date of Patent: Aug. 28, 2007

(54) MOBILE COMMUNICATION TERMINAL

(75) Inventor: Teruhide Sunaga, Saitama (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/135,372

(22) Filed: May 24, 2005

(65) Prior Publication Data
US 2005/0264460 A1    Dec. 1, 2005

(30) Foreign Application Priority Data
May 25, 2004    (JP)    ............................. 2004-154677

(51) Int. Cl.
*H01Q 1/24*    (2006.01)
(52) U.S. Cl. .................... 343/702; 343/866; 455/41.2
(58) Field of Classification Search ................ 343/702, 343/741, 742, 866, 867
See application file for complete search history.

(56) References Cited

U.S. PATENT DOCUMENTS

| | | | |
|---|---|---|---|
| 6,549,789 | B1 | 4/2003 | Kfoury |
| 6,973,327 | B2 * | 12/2005 | Seita ........................ 455/550.1 |
| 7,050,945 | B2 * | 5/2006 | Oba et al. ................... 702/188 |
| 2002/0107054 | A1 | 8/2002 | Fujisawa et al. |
| 2004/0247023 | A1 * | 12/2004 | Sasai et al. .................. 375/220 |
| 2004/0259499 | A1 * | 12/2004 | Oba et al. ................... 455/41.2 |
| 2006/0097927 | A1 * | 5/2006 | Satoh et al. ................ 343/702 |

FOREIGN PATENT DOCUMENTS

| | | |
|---|---|---|
| EP | 1 528 492 A1 | 5/2005 |
| JP | 10-261055 A | 9/1998 |
| JP | 2000057282 A * | 2/2000 |
| JP | 2003-37861 A | 2/2003 |
| JP | 2004-056413 A | 2/2004 |
| WO | WO 2004/012144 A1 | 2/2004 |

* cited by examiner

Primary Examiner—Tho Phan
(74) Attorney, Agent, or Firm—Sughrue Mion, PLLC

(57) ABSTRACT

A mobile communication terminal includes two housings and a hinge portion for movably coupling the housings together. The terminal further includes: a non-contact communication portion for conducting close range wireless communication; an operation portion; and a display portion. The non-contact communication has a loop-like antenna disposed in one of the housings. The display portion displays information with regard to a communication status of the close range wireless communication. Another communication terminal includes a housing having a display portion and an operation portion disposed therein; and a non-contact communication portion for conducting close range wireless communication. The non-contact communication portion has a loop-like antenna formed in a region of the housing having the display portion disposed therein.

10 Claims, 8 Drawing Sheets

MOBILE COMMUNICATION TERMINAL

BACKGROUND OF THE INVENTION

1. Field of the Invention

The present invention relates to a mobile communication terminal, and more particularly to a mobile communication terminal with a non-contact communication function for wireless communication at close range.

2. Description of the Related Art

These days, a technology is widespread for conducting wireless communication at close range utilizing, for example, a non-contact type IC card to carry out user authentication and to transmit/receive information. JP 2004-56413 A discloses a technology where a mobile communication terminal such as a mobile phone conducts the above-mentioned close range wireless communication. More specifically, a mobile phone can have a user identity module (UIM) attached thereto. The UIM has an IC chip, a loop-like antenna coil, such as a loop antenna coil, and the like for close range wireless communication. The antenna coil may be attached to the mobile phone in advance. A user of the mobile phone can use the mobile phone for user authentication, entrance into (or exit from) a specific place, transmittance/reception of information with an external device, and the like.

The UIM is disposed far from a display portion of the mobile phone to keep out of the way of the display portion. It follows that the UIM is proximate to a user's hand which operates a key operation portion. A hand or fingers of the user who grasps the key operation portion degrade antenna characteristics and decrease the sensitivity of the close range wireless communication. In close range wireless communication, a magnetic flux which passes through a center portion of the antenna coil generates induced electromotive force for conducting wireless communication. In order to improve the sensitivity of the wireless communication, it is necessary to, for example, make as much magnetic flux as possible pass through a cross-section of the antenna coil. However, the antenna coil attached to the UIM is an antenna coil having a relatively small cross section. Therefore, the amount of magnetic flux which passes through the center portion of the antenna coil is limited.

SUMMARY OF THE INVENTION

A mobile communication terminal according to one aspect of present invention includes two housings and a hinge portion for movably coupling the housings together. The mobile communication terminal further includes: a non-contact communication portion for conducting close range wireless communication; an operation portion; and a display portion. The non-contact communication portion has a loop-like antenna disposed in one of the housings. The display portion displays information with regard to a communication status of the close range wireless communication.

A mobile communication terminal according to another aspect of the present invention includes: a housing having a display portion and an operation portion disposed therein; and a non-contact communication portion for conducting close range wireless communication. The non-contact communication portion has a loop-like antenna formed in a region of the housing having the display portion disposed therein. The display portion displays information with regard to a communication status of the close range wireless communication.

The mobile communication terminal permits highly sensitive close range wireless communication with a user's confirmation of the communication through the display portion.

BRIEF DESCRIPTION OF THE DRAWINGS

The above and other objects, features and advantages of the present invention will become apparent from the following detailed description when taken with the accompanying drawings in which.

DETAILED DESCRIPTION OF THE PREFERRED EMBODIMENTS

Figure 1:
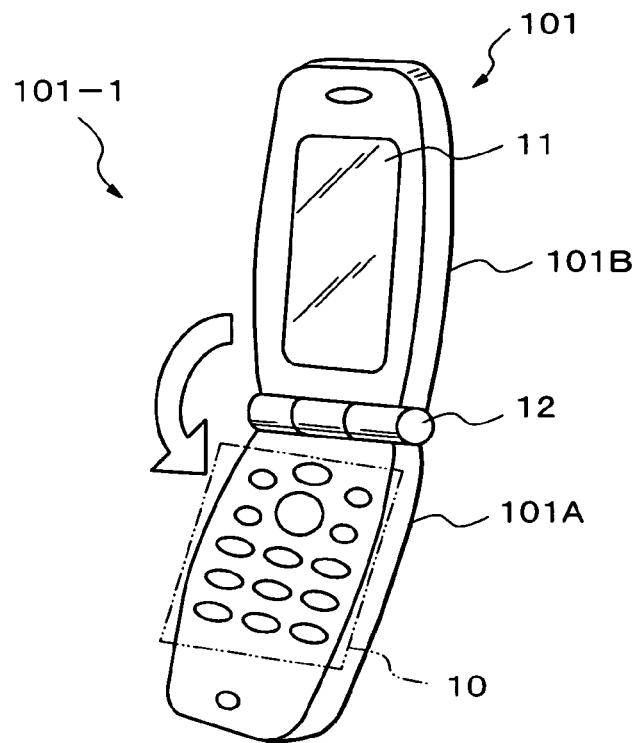
FIG. 1 is a perspective view of an embodiment of a folding-type mobile phone in an extended state according to the present invention.
Figure 2:
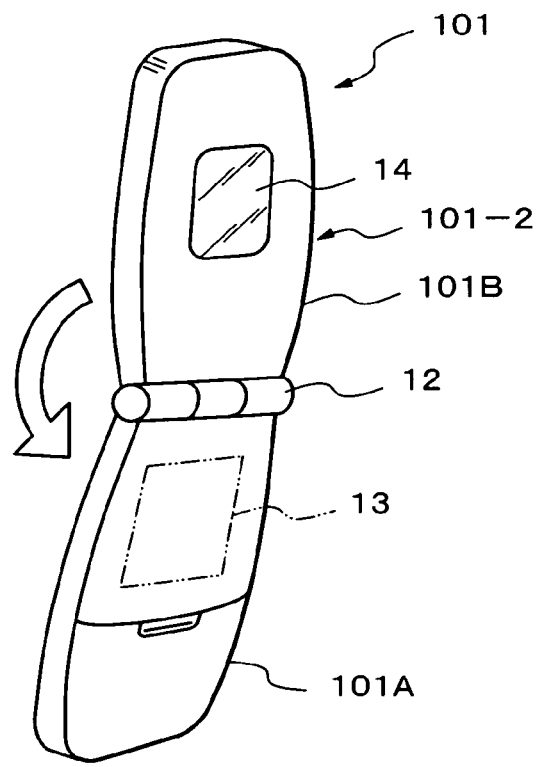
FIG. 2 is a perspective view of the embodiment of the folding-type mobile phone in the extended state according to the present invention.

Exemplary folding-type mobile phones as preferred embodiments of a mobile communication terminal according to the present invention are described in the following. With reference to FIG. 1, a mobile phone 101 has an operation unit 101A serving as a first housing and a display unit 101B serving as a second housing. A hinge 12 rotatably couples the two housings. FIG. 1 illustrates the mobile phone in an extended state. A face which appears when the mobile phone is extended is herein referred to as a front face 101-1. Operation buttons 10 are disposed on the front face of the operation unit 101A. A front face display portion 11 is disposed on the front face of the display unit 101B. FIG. 2 illustrates a rear face 101-2 of the mobile phone. A battery housing portion 13 is disposed on the rear face of the operation unit 101A. A rear face display portion 14 is disposed on the rear face of the display unit 101B. The rear face display portion 14 can be used when the housings are folded together.

Figure 3:
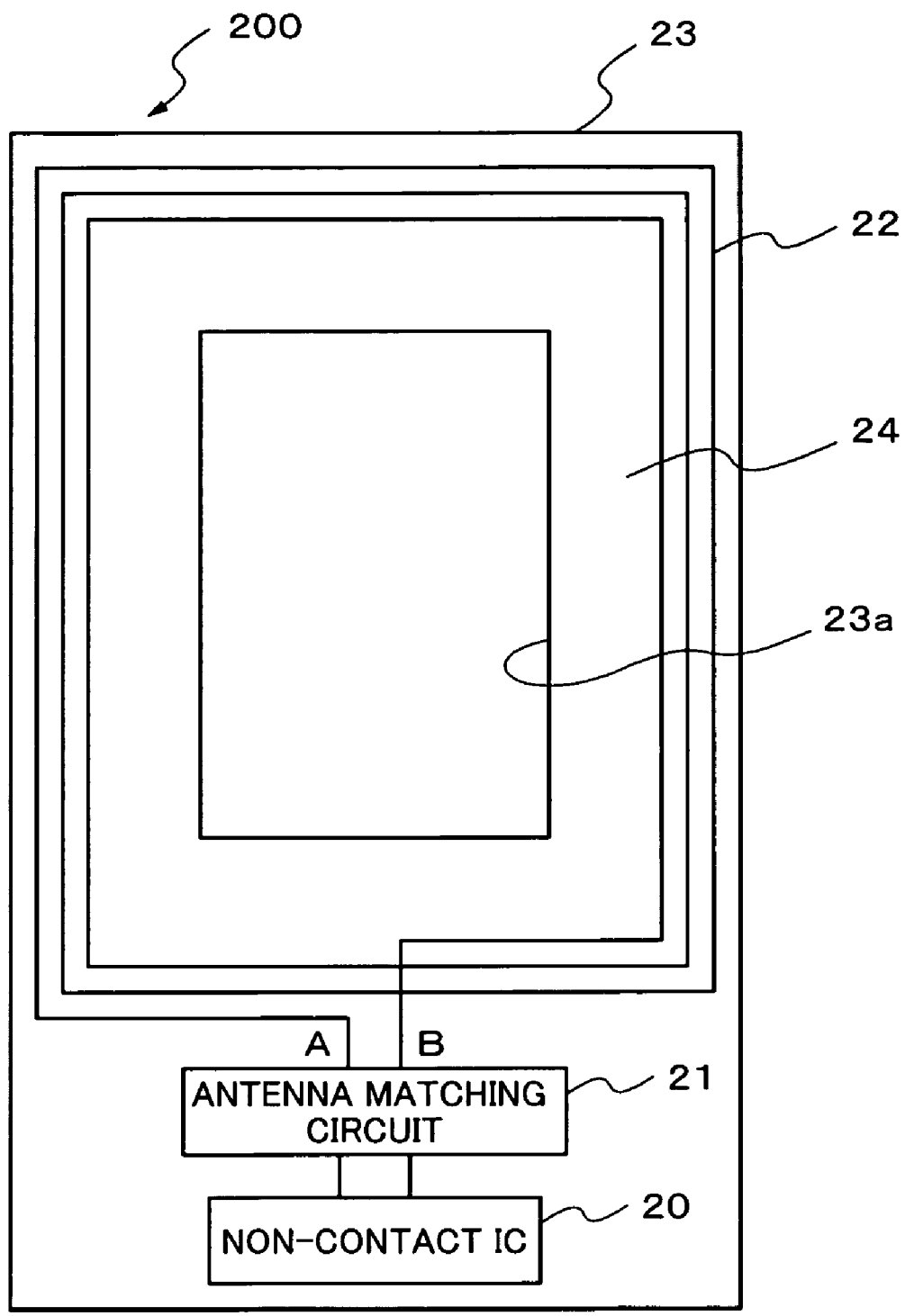
FIG. 3 illustrates an exemplary non-contact communication portion built in the mobile phone.

FIG. 3 illustrates an exemplary non-contact close range communication portion 200. The communication portion 200 is disposed in the display unit 101B, and, for example, transmits and receives information to and from an external communication device via non-contact close range communication with the external communication device. The communication portion 200 has a known non-contact IC 20, an antenna matching circuit 21, and a loop-like antenna 22, all formed on a circuit board 23. The loop-like antenna 22 is connected with a terminal A and a terminal B of the antenna matching circuit 21, and patterned along an outer peripheral portion of the circuit board 23. In this example, the loop is a three-turn loop. The larger the number of turns becomes, the stronger the generated induced electromotive force becomes. A rectangular through hole 23a is formed at the center of the circuit board 23. The rear face display portion 14 is disposed in the through hole 23a. A region inside the loop of the antenna is an antenna opening 24, through which a magnetic flux of a magnetic field generated by the external communication device passes. The magnetic flux makes the loop generate the induced electromotive force to actuate the non-contact IC 20. As a result, non-contact close range communication between the mobile phone 101 and the external communication device is conducted. It is preferable that the size of the circuit board 23 substantially equals to the size of an inner component shape of the display unit 101B. Since the large antenna opening 24 permits much magnetic flux to pass therethrough, it makes the antenna generate a strong induced electromotive force, which enables high quality close range communication between the mobile phone 101 and the external communication device. It is preferable that the circuit board 23 is disposed in the display unit 101B where the battery housing portion 13 is not disposed. Since there are a relatively few metal components in the display unit 101B, generation of eddy current is suppressed.

Figure 4:
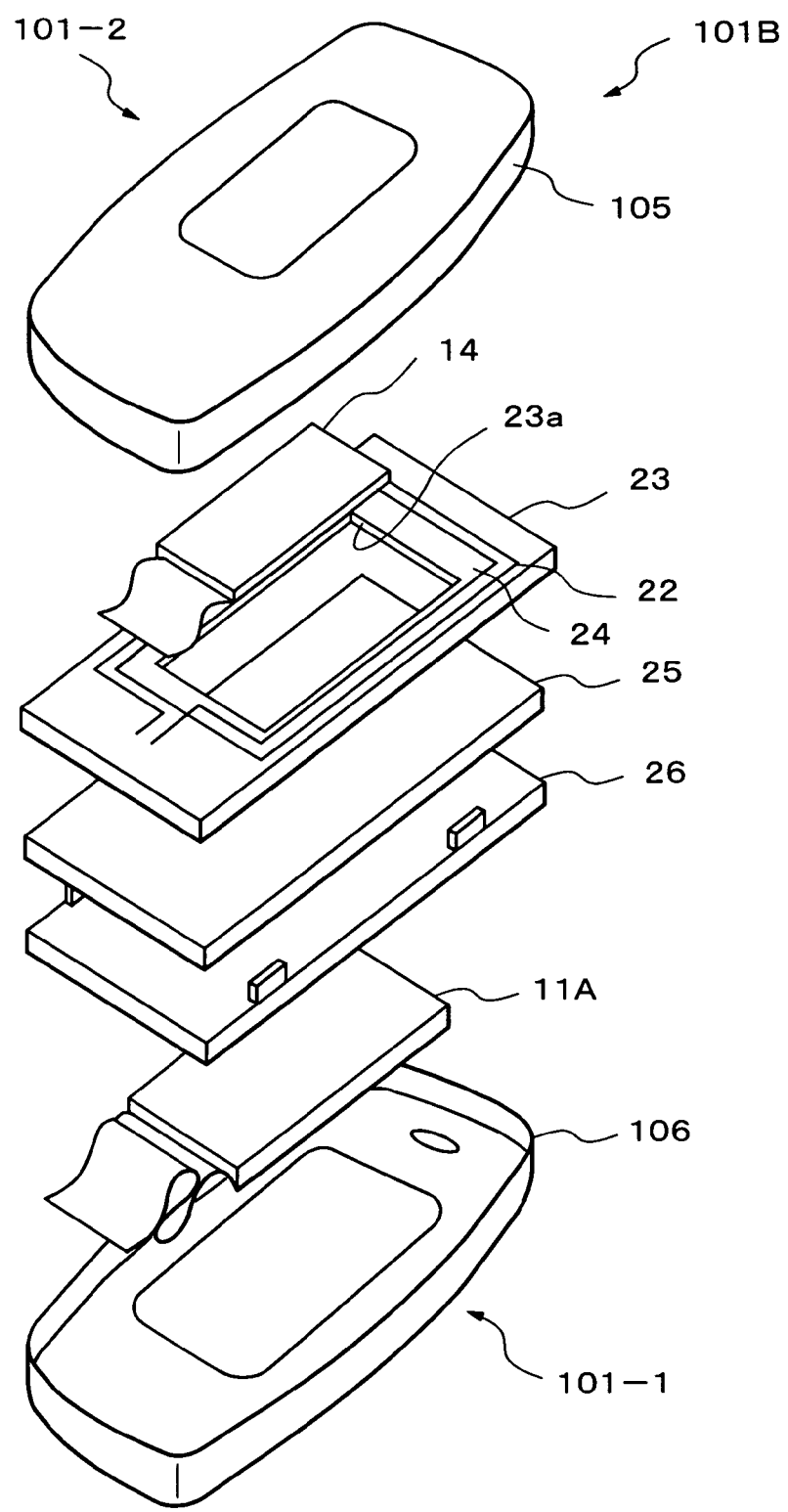
FIG. 4 is an exploded perspective view of a display unit of the mobile phone according the embodiment of the present invention.

FIG. 4 is an exploded perspective view of the display unit 101B of the mobile phone 101 according to the embodiment. The display unit 101B includes a rear cover 105 on the side of the rear face 101-2. A through hole is formed at the center of the rear cover 105. The rear face display portion 14 is disposed in the through hole. The circuit board 23, a magnetic substance sheet 25, a display frame 26, the front face display portion 11, and a front cover 106 are disposed in this order under the rear face display portion 14. The rear face display portion 14 and the front face display portion 11 are provided with hardware necessary for operation, respectively. The magnetic substance sheet 25 increases the magnetic flux density in the antenna opening 24 and increases the inductance. The magnetic permeability of the material, for the magnetic substance sheet 25 is higher than one. The rear cover 105 and the front cover 106 are typically made of non-magnetic aluminum or the like. When a magnetic flux passes through those covers, an eddy current may be generated in the covers. The magnetic substance sheet 25 guides a magnetic flux generated in the vicinity of the antenna 22 to suppress generation of an eddy current. The loop-like antenna 22 is disposed on the rear face side of the circuit board 23. The circuit board 23 and the rear face display portion 14 are connected with each other by thermocompression bonding or by a connector. Since the rear face display portion 14 is disposed in the through hole 23a of the circuit board 23, the display unit 101B can be formed as a thin and lightweight one. Both of the circuit board 23 and the magnetic substance sheet 25 are fit into the display frame 26. Further, the front face display portion 11 can be connected with the circuit board 23 by thermocompression bonding or by a connector.

When a user of the mobile phone conducts non-contact close range communication, the user extends the housings of the mobile phone as illustrated in FIG. 1. The user operates predetermined operation keys to actuate the non-contact communication portion 200 and selects predetermined operation. In order to permit the antenna opening 24 to capture the magnetic flux of the magnetic field generated by the external communication device, the user holds the operation unit 101A of the mobile phone and brings the display unit 101B close to the external communication device. When non-contact close range communication is conducted, the front face display portion 11 displays the status of the non-contact close range communication (for example, whether the communication is successful or not, and the strength of the magnetic field). The user can confirm whether the communication with the external communication device is successful or not and the like, and, according to the result, can further conduct necessary operation. Since the loop-like antenna 22 is disposed in the display unit 101B, the user's hand or fingers are prevented from degrading the sensitivity of the communication. In recent years, an antenna for phone communication is often disposed in a housing of a mobile phone. Especially, an antenna for phone communication of a folding-type mobile phone is often disposed in the operation unit 101A. If the antenna 22 for non-contact close range communication is disposed in the display unit 101B, the antenna 22 is less likely to affect the phone communication.

Figure 5:
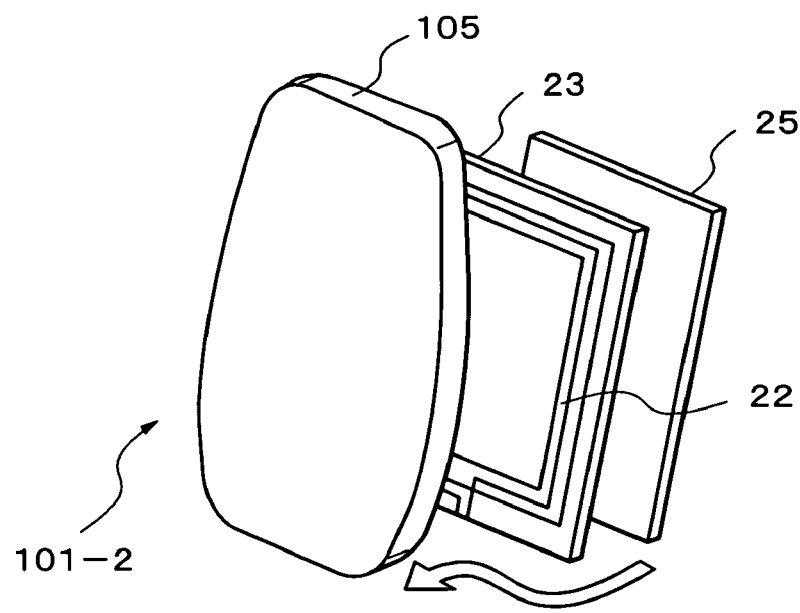
FIG. 5 illustrates another exemplary display unit of the mobile phone according the embodiment of the present invention.
Figure 6:
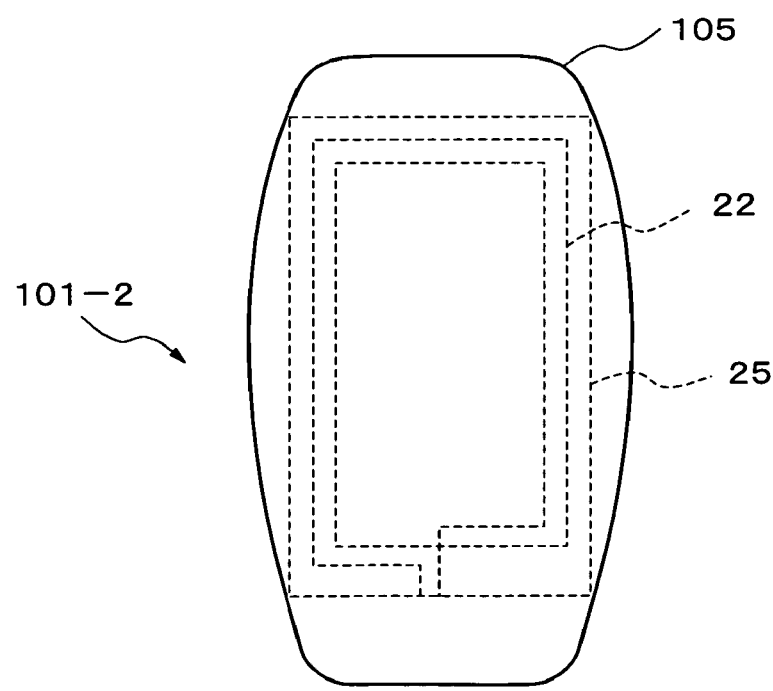
FIG. 6 is a front view of the display unit illustrated in FIG. 5.

FIGS. 5 and 6 illustrate an exemplary rear face 101-2 of a display unit 101B without the rear face display portion 14. A circuit board 23 having an antenna 22 formed thereon and a magnetic substance sheet 25 can be affixed to a rear cover 105.

Figure 7:
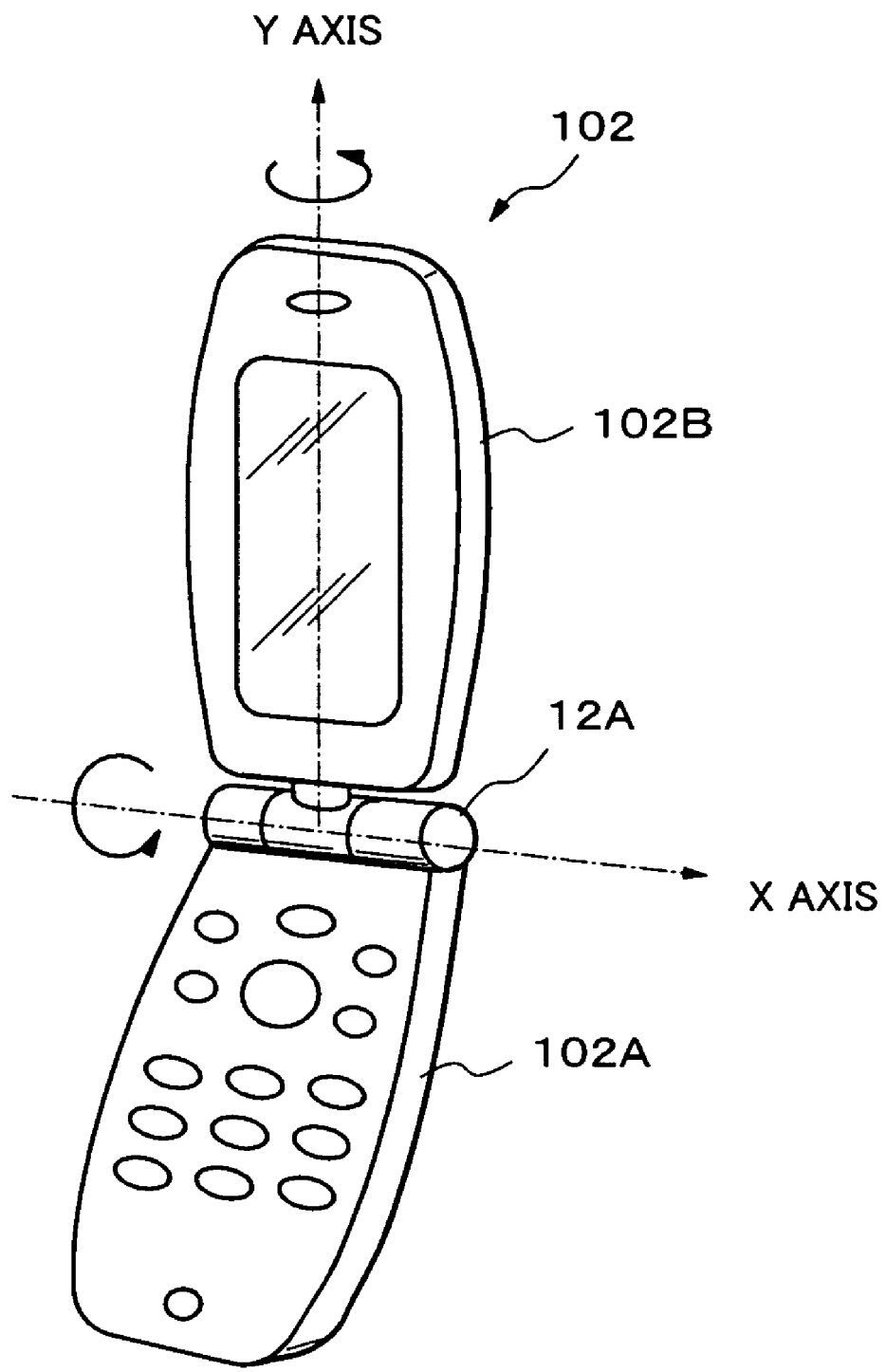
FIG. 7 illustrates another exemplary folding-type mobile phone.
Figure 8:
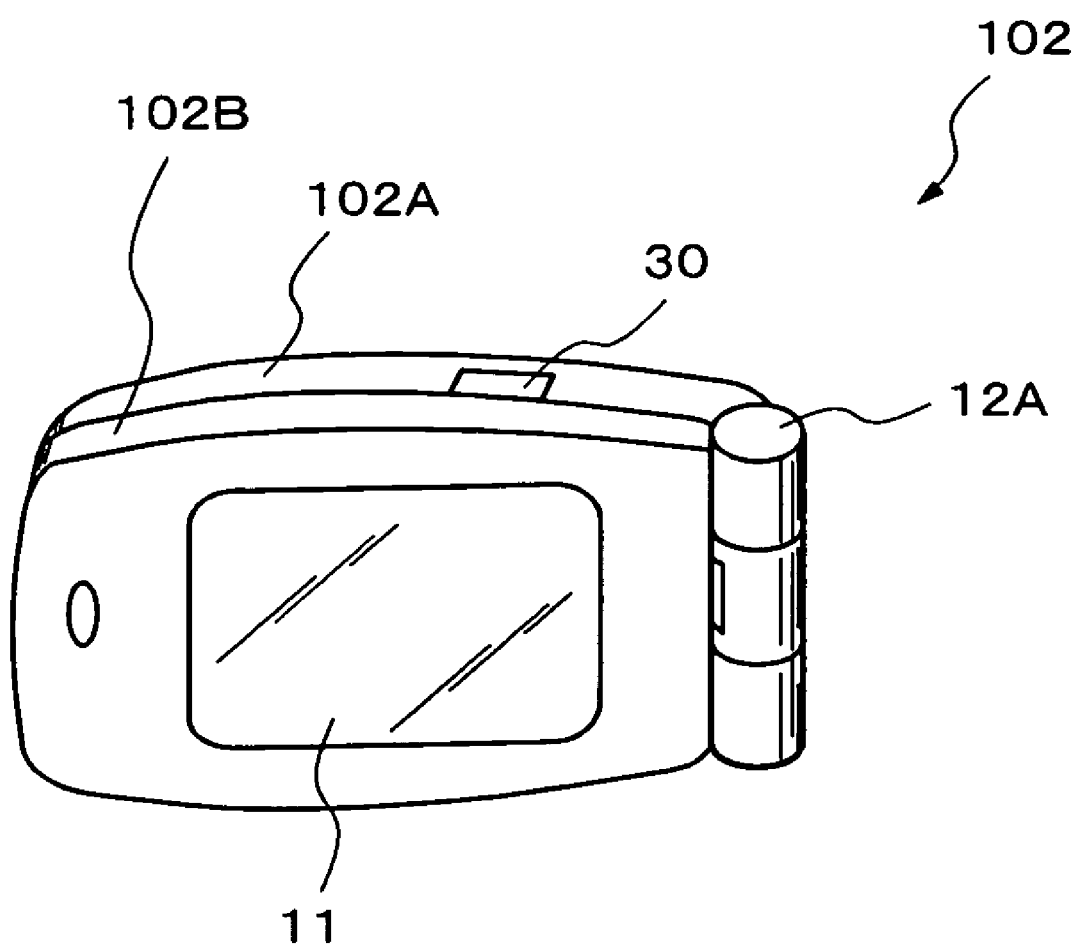
FIG. 8 illustrates the mobile phone illustrated in FIG. 7 in a folded state.

FIG. 7 illustrates another exemplary mobile phone to which the present invention is applicable. In this mobile phone 102, a two-axis type hinge 12A rotatably couples a display unit 102B and an operation unit 102A. The display unit 102B can rotate about an X axis and further can rotate about a Y axis illustrated in the figure. A user can fold down the display unit 102B by rotating it by 180 degrees and then rotating it about the X axis. Here, the mobile phone 102 having the two-axis type hinge 12A has an outer appearance as illustrated in FIG. 8. The user can see a front face display portion 11 with the mobile phone 102 folded down. The user can operate a side key 30 disposed on a side of an operation unit 102A to conduct close range communication with an external communication device, and can confirm the status of the communication through the front face display portion 11.

Figure 9:
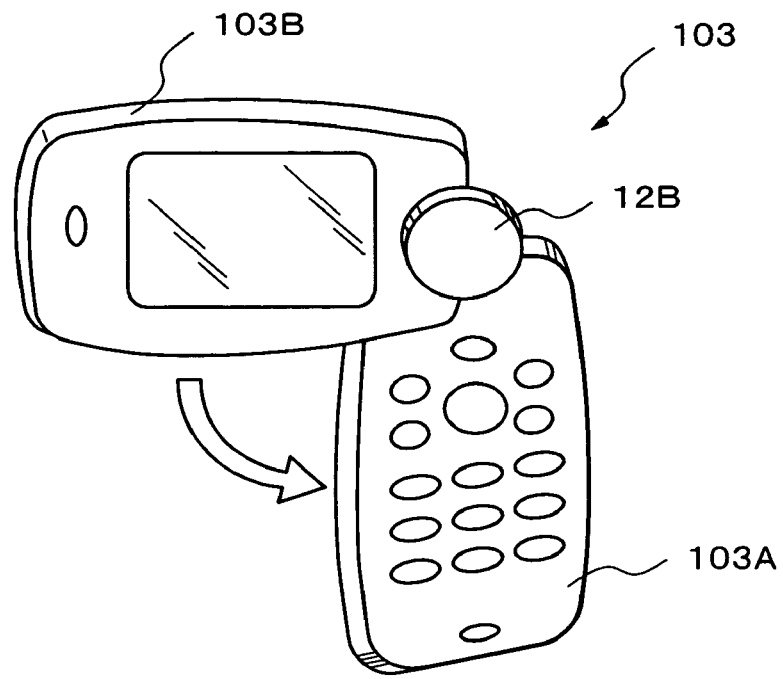
FIG. 9 illustrates still another exemplary folding-type mobile phone.

FIG. 9 illustrates still another exemplary mobile phone to which the present invention is applicable. In this mobile phone 103, a display unit 103B horizontally rotates about a rotation type hinge 12B. As a result, similarly to the outer appearance illustrated in FIG. 8, two units of the mobile phone 103 overlap each other.

Figure 10:
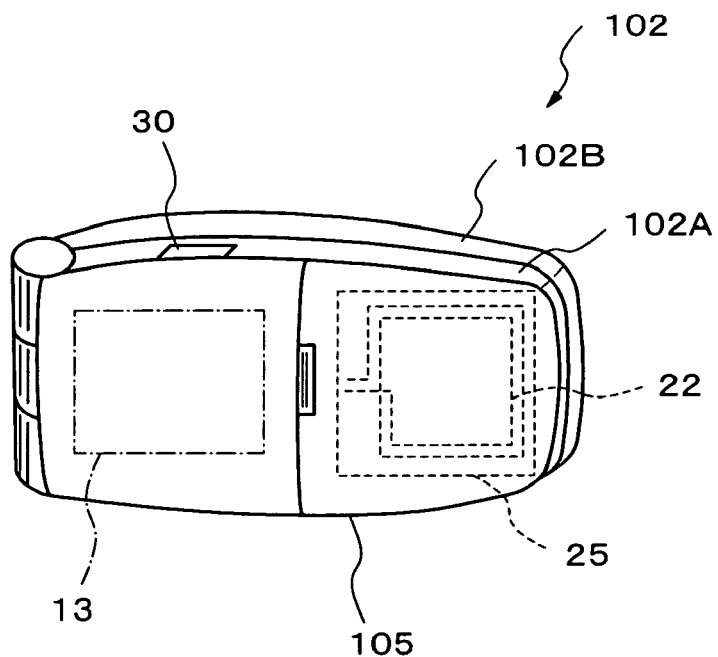
FIG. 10 illustrates an exemplary mobile phone with an antenna disposed in an operation unit.

FIG. 10 illustrates an exemplary mobile phone 102 with an antenna 22 disposed in an operation unit 102A of the mobile phone 102. The antenna 22 is disposed in a region in the operation unit 102A adjacent to a battery housing portion 13. If a user can bring the mobile phone 102 very close to an external communication device, the antenna 22 in the operation unit 102A can sufficiently capture a magnetic flux of a magnetic field generated by the external communication device. The user brings the folded mobile phone close to the external communication device and operates a side key 30 to conduct close range communication. Here, the user can confirm whether the communication is successful or not through a rear face display portion 14. In order to improve the communication quality, a multiple loop antenna or a magnetic substance sheet 25 having a high magnetic permeability may be disposed.

Figure 11:
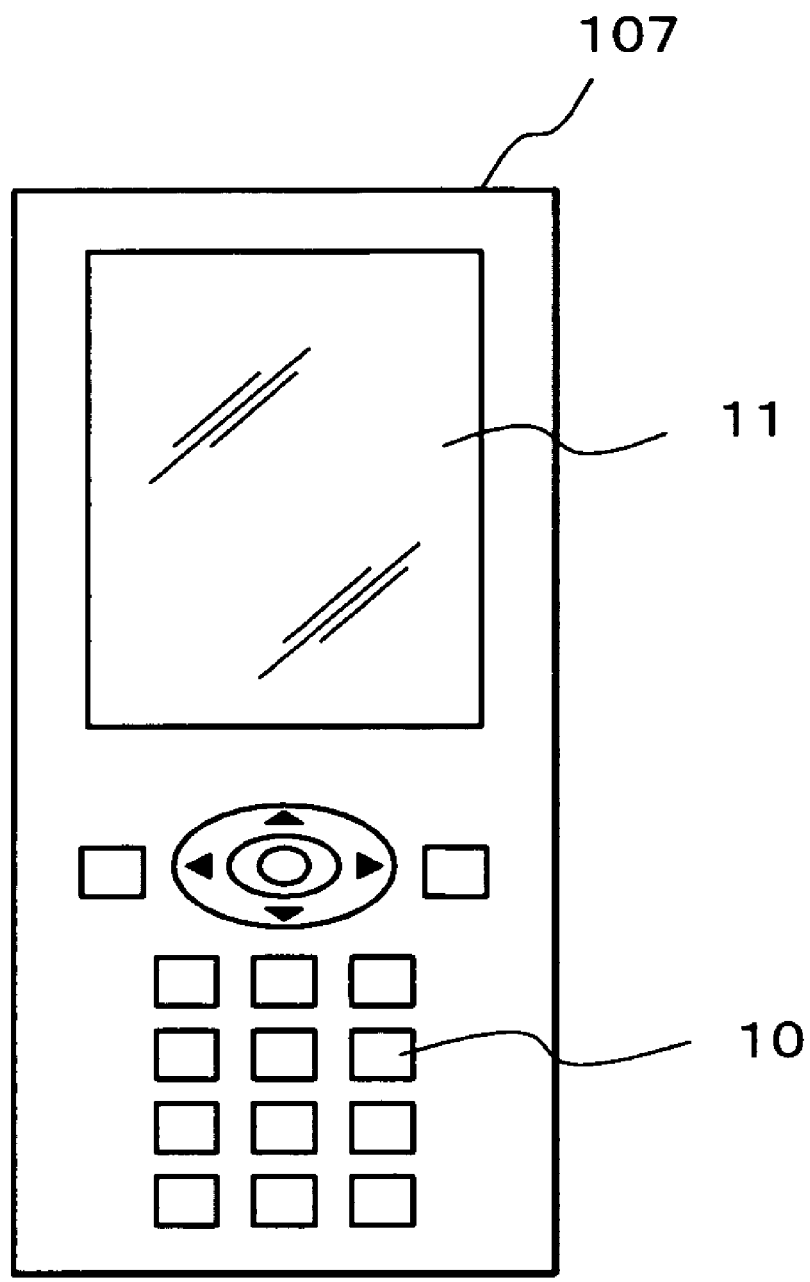
FIG. 11 illustrates an exemplary straight-type mobile phone having one housing.

FIG. 11 illustrates an exemplary straight-type mobile phone 107 having one housing. An antenna 22 is disposed around a front face display portion 11. In this mobile phone

107, also, by disposing a multiple loop antenna 22 and a magnetic substance sheet 25 having a high magnetic permeability, close range communication with an external communication device is made possible.

As the above-described circuit board 23, a known film-like flexible circuit board, for example, is preferable. If the antenna opening 24 is sufficiently large and the material for the covers does not impair the antenna characteristics, it is possible not to dispose the magnetic substance sheet 25. The present invention is applicable to a wide range of wireless communication device such as personal digital assistants (PDAs).

While the present invention has been described in connection with certain preferred embodiments, it is to be understood that the subject matter encompassed by the present invention is not limited to those specific embodiments. On the contrary, it is intended to include all alternatives, modifications, and equivalents as can be included within the spirit and scope of the following claims.

Further, it is the inventor's intent to refrain all equivalents of the claimed invention even if the claims are amended during prosecution.

What is claimed is:

1. A mobile communication terminal having two housings and a hinge portion for movably coupling the housings together, comprising:
   a non-contact communication portion for conducting close range wireless communication;
   an operation portion; and
   a display portion,
   wherein the non-contact communication portion comprises a loop antenna disposed in one of the housings, and
   the display portion displays information with regard to a communication status of the close range wireless communication wherein the loop antenna is patterned on a circuit board in the mobile communication terminal wherein the circuit board has a through hole formed at a center thereof.

2. A mobile communication terminal according to claim 1, wherein the information includes at least information whether communication with an external device is successful or not.

3. A mobile communication terminal according to claim 1, wherein the loop antenna has a loop of at least two turns.

4. A mobile communication terminal according to claim 1, wherein a magnetic substance sheet is disposed proximate to the loop antenna.

5. A mobile communication terminal according to claim 4, wherein the magnetic substance sheet is disposed in at least a region corresponding to a region inside a loop of the loop antenna.

6. A mobile communication terminal according to claim 4, wherein the magnetic substance sheet comprises a material having a magnetic permeability higher than one to increase a magnetic flux density inside a loop of the loop antenna.

7. A mobile communication terminal according to claim 1, wherein the hinge portion foldably couples the two housings together.

8. A mobile communication terminal according to claim 1, wherein the hinge portion comprises two rotation axes.

9. A mobile communication terminal according to claim 1, wherein the display portions are disposed on each of opposing sides of the two housings.

10. A mobile communication terminal having two housings and a hinge portion for movably coupling the housings together, comprising:
    a non-contact communication portion for conducting close range wireless communication;
    an operation portion; and
    a display portion,
    wherein the non-contact communication portion comprises a loop antenna disposed in one of the housings, and
    the display portion displays information with regard to a communication status of the close range wireless communication, wherein one of the housings comprises the display portion, the other of the housings comprises the operation portion, and
    the loop antenna is disposed proximate to an outer periphery of the housing comprising the operation portion, wherein the hinge portion comprises two rotation axes, and wherein the operation portion is disposed on at least two faces of the other of the housings and is operable when the two housings are folded together.

* * * * *